United States Patent [19]
Parks et al.

[11] Patent Number: 5,483,260
[45] Date of Patent: Jan. 9, 1996

[54] METHOD AND APPARATUS FOR SIMPLIFIED VIDEO MONITOR CONTROL

[75] Inventors: Terry J. Parks, Round Rock; Joseph W. Bell, Jr., Austin, both of Tex.

[73] Assignee: Dell USA, L.P., Austin, Tex.

[21] Appl. No.: 119,938

[22] Filed: Sep. 10, 1993

[51] Int. Cl.$^6$ ............................ G06F 15/00; G09G 5/00
[52] U.S. Cl. ........................... 345/156; 345/3; 345/213; 395/162
[58] Field of Search .................................. 345/156, 213, 345/3, 1, 2, 211, 212, 157, 163, 132, 154; 395/275, 162

[56] References Cited

U.S. PATENT DOCUMENTS

| | | | |
|---|---|---|---|
| 4,626,837 | 12/1986 | Priestly | 345/213 |
| 5,138,305 | 8/1992 | Tomiyasu | 345/3 |
| 5,270,821 | 12/1993 | Samuels | 345/156 |

FOREIGN PATENT DOCUMENTS 2270451  9/1994  United Kingdom ................ 345/156

OTHER PUBLICATIONS

700 IBM Technical Disclosure Bulletin vol. 30 No. 2 (1987) Jul., Armonk, N.Y., USA.

*Primary Examiner*—Tommy P. Chin
*Assistant Examiner*—Kara A. Farnandez
*Attorney, Agent, or Firm*—Jeff Hood; James Huffman

[57]  ABSTRACT

A method and apparatus which provides bi-directional communication between a video monitor and a computer system unit. This enables the video monitor to inform the system unit of its capabilities without direct user involvement and also enables the system unit to directly control or adjust all the functions of the video monitor. In the preferred embodiment, bi-directional communication between the video monitor and the system unit is provided utilizing a mouse port in the keyboard controller. Multiplexors are coupled between the mouse port and each of the mouse and video monitor to select between data paths and selectively allow communication between the system unit and the video monitor. Monitor control software is included in the system unit which can be used to control or adjust the output of the video monitor. When a user desires to adjust the output of the video monitor, the monitor control software directs the multiplexors to provide a communication path between the system unit and the video monitor, and the system unit relates the control information input from the user to the video monitor, which adjusts its visual output accordingly. Also, at each power-on of the computer system, the data path between the keyboard controller and video monitor is selected to enable the video monitor to provide capability information to the system unit.

29 Claims, 5 Drawing Sheets

METHOD AND APPARATUS FOR SIMPLIFIED VIDEO MONITOR CONTROL

FIELD OF THE INVENTION

The present invention relates to video monitors in computer systems, and more particularly to a method and apparatus of bi-directional communication between a video monitor and a computer system unit to allow simplified system control of video monitor functions and simplified monitoring of the video monitor's capabilities.

DESCRIPTION OF THE RELATED ART

A computer system essentially comprises a system unit housing a microprocessor, computer memory, and various other support logic, as well as various input/output (I/O) devices which are connected to the system unit and enable a user to intelligently interact with the system unit. Examples of various types of input devices include a keyboard, a mouse, a trackball, and a pen computer, as well as others. The primary output devices in a computer system include a video display monitor (video monitor) and a printer.

For most users, the video monitor is the most important device in a computer system because it provides the output that the user actually sees. The video monitor provides the user with instant visual feedback and enables the computer to be interactive with the user. Current video monitors have many controls which vary the image or picture that is presented on the screen, including controls for such things as horizontal and vertical size, horizontal and vertical position, PCC (pin cushion control) amp and phase, key and pin balance, color balance, brightness and contrast, and power control. These controls are typically expensive and some are very difficult to use. In addition, these controls require non-volatile memory in the video monitor in order to remember the settings between power cycles. The requirement of non-volatile memory for these settings further adds to the cost of the monitor. Therefore, an improved method and apparatus is desired which provides communication between the computer system unit and the video monitor to allow simplified system control of monitor functions.

There currently exist a number of different types of video monitors available for computer systems, including both monochrome and color monitors. Various types of color video monitors include composite color, RGB, enhanced RGB, VGA, and multiscanning or multisync monitors. In addition, a wide array of video display adapter standards are available, including CGA (color graphics adapter), EGA (enhanced graphics adapter), VGA (video graphics array), XGA (extended graphics array), and Super VGA, among others. In order for a video monitor to work properly with the display adapter standard being used in the respective system unit, it is important that the system unit know a certain amount of information about the monitor, including the capabilities such as resolution, refresh frequency, and interlace method that the monitor supports.

Resolution refers to the sharpness of a video image that appears on the screen. In graphics mode, a video screen is comprised of a number of individual picture elements (pixels) which may each be individually addressed and activated to form an image on the screen. Resolution refers to how many individual pixels can be resolved across the screen, i.e. resolution indicates the number of pixels comprising the screen. For example, a standard VGA display screen has a resolution of 640 horizontal pixels by 480 vertical pixels.

Another variable among computer video monitors is referred to as the refresh frequency. Essentially, a monitor must be able to synchronize to two synchronizing frequencies, these being the vertical frequency or refresh rate and the horizontal synchronizing frequency, referred to as the horizontal scan rate. The vertical frequency or refresh rate determines the rate at which the complete screen is updated. VGA and most other video standards use refresh rates between 60 and 70 Hz. The horizontal scan rate indicates the rate at which individual scan lines that make up the image are drawn. The frequency ranges that a monitor can handle essentially determine which video standards the video monitor can work with, and it is critical that the monitor be able to synchronize to the synchronizing frequencies used by a respective video adapter. For example, the CGA standard requires a horizontal frequency of 15.75 kHz, MDA requires 18 kHz, EGA requires 22 kHz, and VGA requires 31.5 kHz. Also, with regard to resolutions used by the Super VGA standard, horizontal frequencies depend on the refresh rate or vertical frequency used. For example, at a 56 Hz refresh rate, a 35 kHz horizontal frequency is adequate. However, using the VESA (Video Electronic Standards Association) 72 Hz refresh rate specification, a 48 kHz horizontal frequency is required. The horizontal scan rate is typically determined from the monitor's refresh rate and resolution, and thus the system unit does not need to receive capability information from the video monitor regarding its horizontal scan rate.

Another variable among video monitors is whether the monitor uses an interlaced method for generating individual scan lines on the computer video screen. An interlaced system operates such that, instead of scanning the image from top to bottom on the video screen one line after another, each frame of the image is broken in half into two fields. One field consists of odd numbered lines of the image, and the other consists of the even numbered lines of the image. The electron beam which creates the image on the screen sweeps across and down the screen illuminating every other line and then moves back to the top and finishes with the lines it missed on the first pass. This technique achieves an apparent doubling of the frame rate. Video monitors which do not perform interlacing merely sweep across and down the screen illuminating every line on the screen in one pass.

Due to the wide variety of different video monitors available, it is imperative that the computer system unit know which capabilities the monitor supports, such as the resolution, interlace method, and refresh frequency. Currently there is no way for the computer system unit to determine this information independently, and therefore current systems require the user to inform the system as to what kind of monitor is installed. This is both inconvenient for the user and, when erroneous information is provided, sometimes results in a suboptimal system/monitor interface. The standard established by VESA includes a proposal in which monitor capabilities are provided on a diskette which is shipped with each monitor. However, this is an inferior solution for several reasons. First, requiring a diskette containing monitor capabilities to be shipped with each monitor adds to the expense of the video monitor. In addition, requiring use of a diskette for monitor installation is inconvenient for the user. The diskette is prone to being lost after a first installation, thus making subsequent installations considerably more difficult. Therefore, a method and apparatus is desired which enables the video monitor to communicate capability and/or configuration information to the computer system unit without requiring user involvement.

SUMMARY OF THE INVENTION

The present invention comprises a method and apparatus which provides bi-directional communication between the video monitor and the system unit. This enables the video monitor to inform the system unit of its capabilities without user involvement and also enables the system unit to directly control all the functions of the video monitor.

In the preferred embodiment of the invention, bi-directional communication between the video monitor and the system unit is provided utilizing a mouse port in the keyboard controller. Bi-directional multiplexors are coupled to the keyboard controller and provide outputs to each of the mouse and the video monitor. When the mouse port in the keyboard controller is being used to control the mouse, the multiplexors provide the respective data signals from the keyboard controller to the mouse as would normally be done. However, when communication is desired between the system unit and the video monitor, the multiplexors provide a communication path between the keyboard controller and the video monitor.

Monitor control software is included in the system unit which can be used to control or adjust the output of the video monitor. When a user desires to adjust the output of the video monitor, the monitor control software directs the multiplexors to provide a communication path between the system unit and the video monitor. The monitor control software also generates a user interface on the video monitor that enables a user to easily adjust the operation of the monitor. The system unit relates the control information input from the user to the video monitor, which adjusts its visual output accordingly. Therefore, no separate controls on the video monitor are required. Also, no non-volatile memory is required in the video monitor, but rather the settings are preferably stored in the CMOS memory inside the computer system. Also, at each power-on of the computer system, the data path between the keyboard controller and video monitor is selected to enable the video monitor to provide capability information to the system unit such as resolution, interface method, and refresh frequency. Thus, this information is automatically provided to the system unit without direct user involvement.

BRIEF DESCRIPTION OF THE DRAWINGS

A better understanding of the present invention can be obtained when the following detailed description of the preferred embodiment is considered in conjunction with the following drawings, in which.

DETAILED DESCRIPTION OF THE PREFERRED EMBODIMENT

Figure 1:
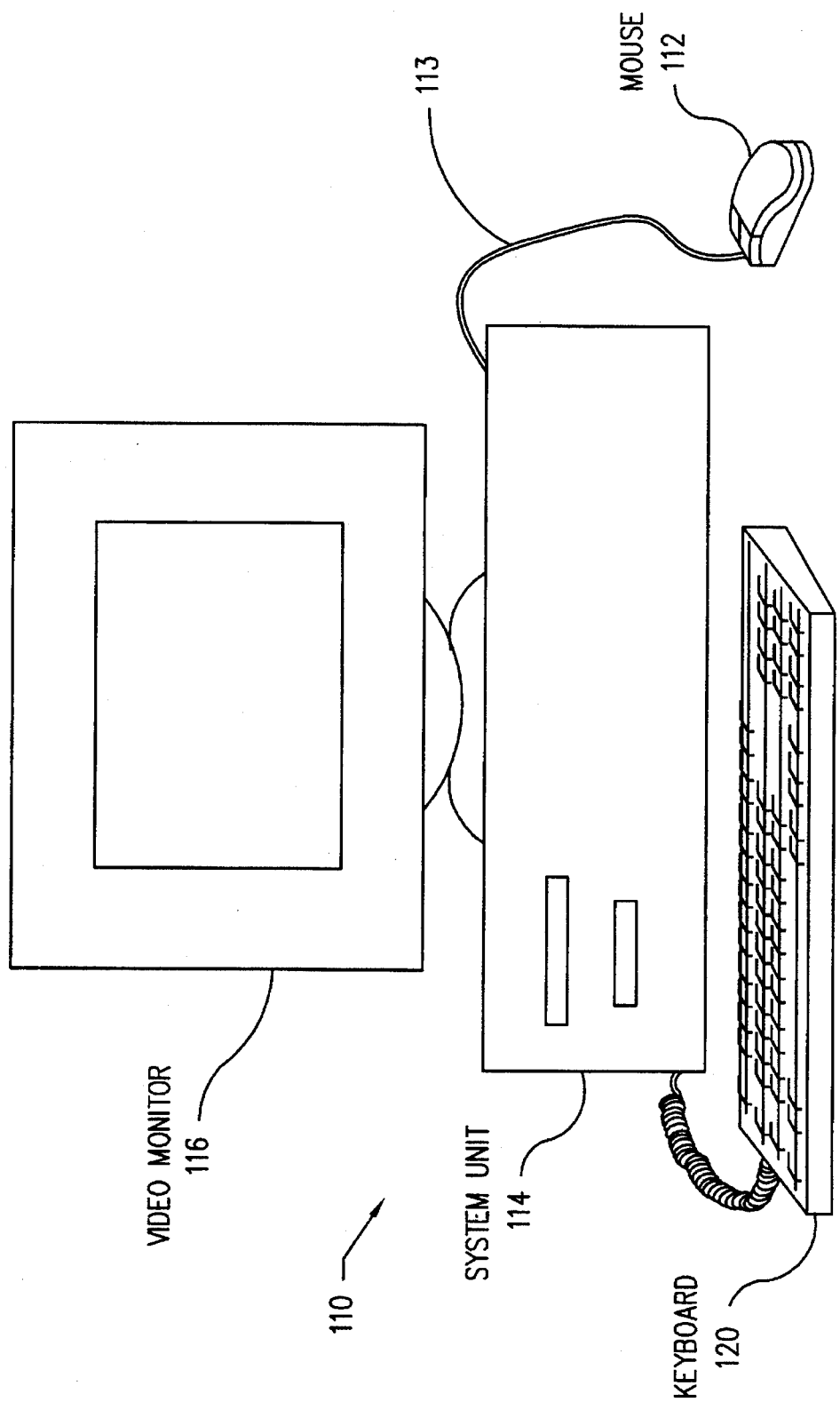
FIG. 1 illustrates a computer system according to the preferred embodiment of the invention.

Referring now to FIG. 1, a computer system 110 according to the preferred embodiment of the invention is shown. The computer system 110 includes a system unit 114, a video monitor 116 connected to the system unit 114, a pointing device or mouse 112 connected to the system unit 114 through a cable 113, and also a keyboard 120 preferably connected to the system unit 114. In the embodiment of FIG. 1, the mouse 112 or keyboard 120 may be used by a human user in conjunction with a graphical user interface (GUI) generated on the video monitor 116 to adjust the visual output of the video monitor 116.

Figure 2:
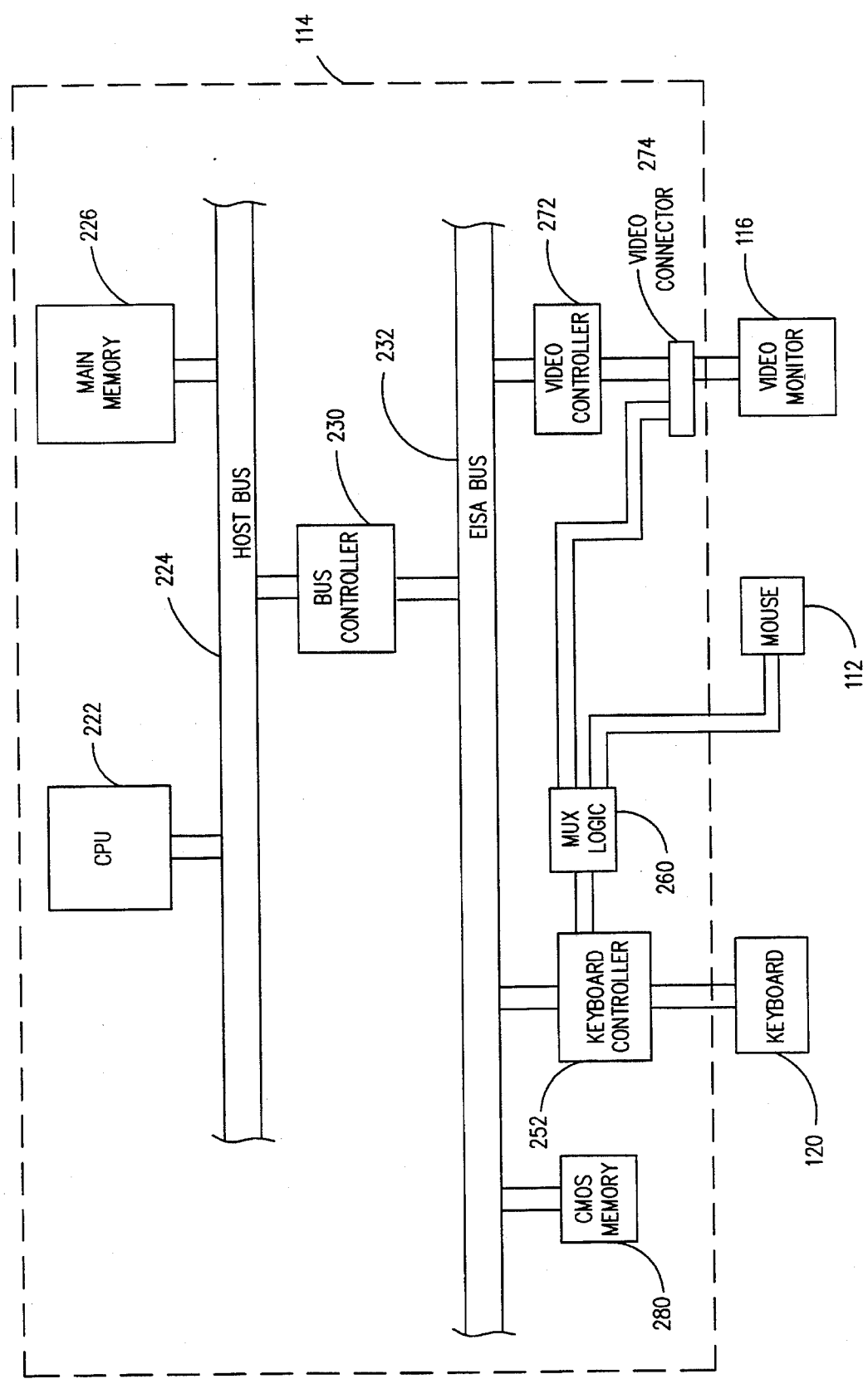
FIG. 2 is a block diagram illustrating the computer system of FIG. 1.

Referring now to FIG. 2, a block diagram of the computer system of FIG. 1 according to the present invention is shown. The elements of a computer system that are not important to the operation of the present invention have been omitted for simplicity. The computer system includes a CPU (central processing unit) 222 coupled to a host or memory bus 224. Main memory 226 is also coupled to the host bus 224 and stores video monitor control software, as described below. A bus controller 230 is coupled between the host bus 224 and an input/output (I/O) or expansion bus 232. In the preferred embodiment, the expansion bus 232 is preferably the extended industry standard architecture (EISA) bus 232, although various other types of expansion bus may be used. Also, the bus controller 230 is preferably the Intel 82358 EISA bus controller (EBC).

A keyboard controller 252 is coupled to the expansion bus 232 and in turn is coupled to the keyboard 120. The keyboard controller 252 is preferably the Intel 8042 keyboard controller produced by Intel Corporation. For more information on the 8042 keyboard controller, please see the Intel Embedded Microcontroller Manual, 1993 edition, published by Intel, which is hereby incorporated by reference. The keyboard controller 252 is connected through multiplexor (mux) logic 260 to the mouse 112. The keyboard controller 252 includes a mouse port (FIG. 3) which is used to control operation of the mouse 112. A video controller 272 is connected to the expansion bus 232. The video controller 272 is also connected to a video connector 274 which in turn is connected to the video monitor 116. The keyboard controller 252 is connected through the mux logic 260 to the video connector 274. CMOS memory 280 is also coupled to the expansion bus 222. The CMOS memory 280 provides non-volatile storage for video monitor control data as well as video monitor capability information.

The mux logic 260 enables bi-directional communication between the video monitor 116 and the remainder of the computer system, i.e. the system unit 114. This enables the system unit 114 to adjust the functions of the video monitor 116. In addition, this enables the video monitor 116 to transmit capability information to the system unit 114 without direct user involvement. In this description, the term "direct user involvement" refers to the user having to manually input capability information into the system unit 114 or load this information using a media such as a floppy disk. No direct user involvement is required in the present invention, but rather the capability information is automatically transferred at each power-on of the system unit 114 and monitor 116. Therefore the term "direct user involvement" does not include a user merely turning on the system unit 114, which automatically operates to transfer capability information, but rather the act of simply turning on the system unit 114 is referred to as "indirect user involvement."

Figure 3:
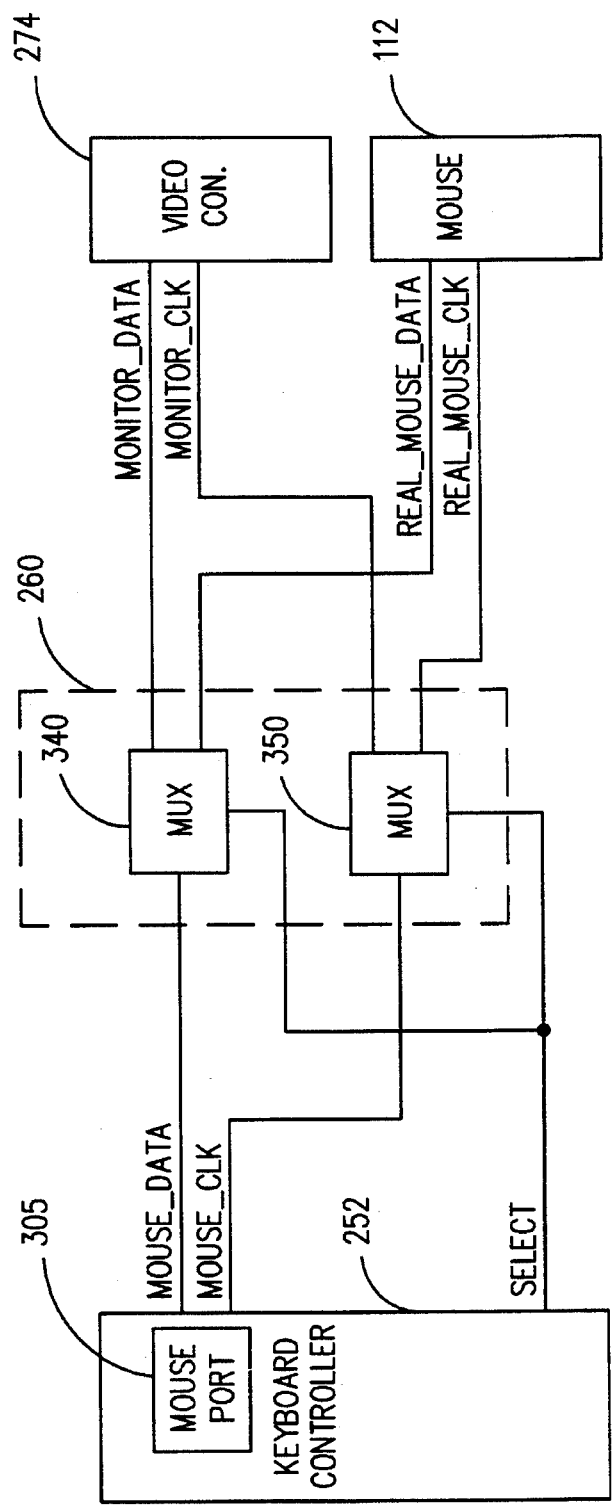
FIG. 3 is a block diagram illustrating the bi-directional communication method and apparatus according to the preferred embodiment of the invention.

Referring now to FIG. 3, a block diagram illustrating the operation of the keyboard controller 252, mux logic 260, video connector 274, and mouse 112 is shown. As shown, mouse port 305 in the keyboard controller 252 generates two open collector signals referred to as MOUSE_DATA and MOUSE_CLK. The MOUSE_DATA and MOUSE_CLK signals are provided to respective bi-directional analog multiplexors 340 and 350, respectively, comprising the mux logic 260. The multiplexor 340 provides an output signal referred to as MONITOR_DATA to the video connector 274 and provides a second signal referred to as REAL_MOUSE_DATA to the mouse 112 as shown. The multiplexor 350 provides a signal referred to as MONITOR_CLK to the video connector 274 and provides a signal referred to as REAL_MOUSE_CLK to the mouse 112. The keyboard controller 252 also outputs a select signal referred to as SELECT that is connected to select inputs of each of the multiplexors 340 and 350. The SELECT signals preferably provided from an unused output of the 8042 keyboard controller 252.

When communication is desired between the system unit 114 and the video monitor 116, i.e., the transfer of monitor capability information from the monitor 116 to the system unit 114 or the transfer of monitor adjustment information from the system unit 114 to the monitor 116, the CPU 222 preferably writes a value to the mouse port in the keyboard controller 252 as mentioned above. This causes the keyboard controller 252 to assert the SELECT signal to the multiplexors 340 and 350 such that the data path between the keyboard controller 252 and the video connector 274 is selected. In other words, the multiplexors 340 and 350 select the MONITOR_DATA and MONITOR_CLK signals. The system unit 114 and the video monitor 116 then communicate in this fashion. When this communication has completed, the CPU 222 writes a new value to the mouse port 305 in the keyboard controller 252, causing the SELECT signal to be negated such that the multiplexors 340 and 350 are switched back to the real mouse signals REAL_MOUSE_DATA and REAL_MOUSE_CLK.

Therefore, in the preferred embodiment of the invention, bi-directional communication between the video monitor 116 and the system unit 114 is provided through the mouse port 305 (FIG. 3) in the keyboard controller 252, and the mux logic 260 is used to provide the switching to enable this bi-directional communication to occur while maintaining the normal function of the mouse port 305 in controlling the mouse 262. The 8042 keyboard controller 252 used in the preferred embodiment already includes commands which provide serial data to the mouse 262, and thus no firmware changes are required to implement the present invention in this preferred embodiment. Also, the data path output from the mux logic 260 that is provided to the video connector 274 is preferably provided to unused pins on the video connector 274, and thus a standard video connector 274 can be used. Also, since unused pins are used, the bi-directional communication provided by the present invention does not interfere with the normal communication between the video controller 272 and the video monitor 116. Therefore, very few changes to the system unit 114 are required.

It is also noted that other embodiments of the invention may use other methods to provide communication between the video monitor 116 and the system unit 114. For example, other communication ports can be used, as desired. Also, the path from the CPU 222 through the video controller 272 to the monitor 116 can be used for bi-directional communication, although this would require modification of existing video controllers to include a separate serial port for this purpose. In addition, U.S. patent application Ser. No. 08/119,937 entitled "Method and Apparatus for Simplified Control of a Video Monitor" filed Sep. 10, 1993 and assigned to the same assignee as the present application discloses a method and apparatus for providing bi-directional communication between a video monitor and a system unit without requiring any hardware modification to the system unit 114. For more information on these embodiments, please see the above-referenced application, which is hereby incorporated by reference.

Capability Information Retrieval

The video controller 272 can use any of the various video standards including CGA, EGA, VGA, XGA, and Super VGA, as well as others. The video monitor 116 can be any of various types and can have any of a number of resolutions and refresh frequencies. In addition, the video monitor 116 may utilize either a standard or interlaced method for drawing an image on the display screen, as desired. Therefore, the video monitor 116 can have varying capabilities, including different resolutions, interlace methods, and refresh frequencies, among others. This capability information generally must be communicated to the system unit 114 in order for the computer system to operate at its maximum efficiency. In prior art systems, direct user involvement is required, i.e., the user is required to manually input this information using either the keyboard 120 or a floppy disk each time a new monitor is installed. In the preferred embodiment of the invention, the mux logic 260 enables the video monitor 116 to communicate this capability information directly to the system unit 114. The information is provided from the video monitor 116 through the mux logic 262 and keyboard controller 252 to the CPU 222. The information is then stored in the CMOS memory 280. This communication of capability information is preferably performed during or after each power on self test (POST) of the computer system without direct user involvement. In another embodiment, this communication of capability information is only performed when a new monitor is installed.

Figure 4:
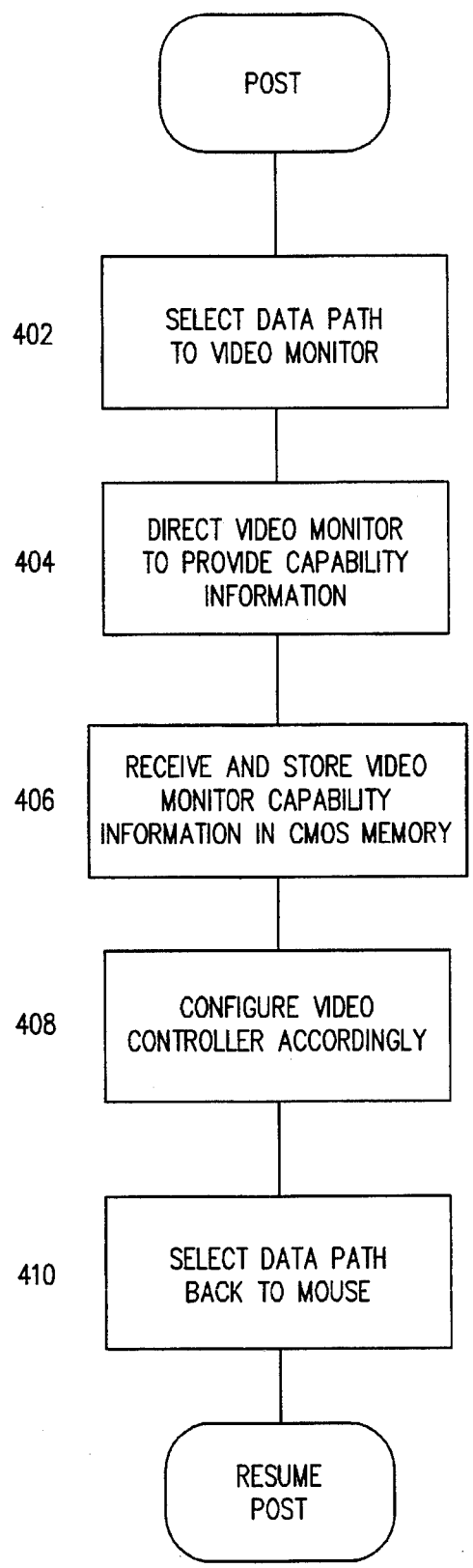
FIG. 4 is a flowchart diagram illustrating a method implemented by the system unit directing the video monitor to provide capability information to the system unit without direct user involvement.

As mentioned above, in the preferred embodiment during each POST procedure the system unit 114 receives capability information from the video monitor 116. FIG. 4 illustrates a portion of the POST procedure which performs this function. However, it is noted that this function can be performed at a time other than performance of the POST. For example, in one embodiment the capability information retrieval method is performed by a terminate and stay resident (TSR) program that executes after the POST has completed. The period of time during or immediately after the POST but before application programs begin execution is referred to in this specification as "power-on" of the computer system.

Referring to FIG. 4, in step 402 the CPU 222 in the system unit 114 writes a value to the mouse port 305 in the keyboard controller 252 directing the mux logic 260 to select the data path to the video connector 274. In step .404 the CPU 222 then provides a value through the keyboard controller 252 to the video monitor 116 directing the video monitor 116 to provide its capability information. Controller logic (not shown) in the video monitor 116 preferably provides the video monitor capability information to the system unit 114. The controller logic outputs this capability information through the mux logic 260 and keyboard controller 252 to the CPU 222. This information is also preferably stored in the CMOS memory 280 in step 406. When the system unit 114 and the video monitor have finished communicating, then the mux logic 260 is directed to select the data path to the mouse 112 in step 410, and thus the mouse 112 receives information from the mouse port 305 in the keyboard controller 252 as would normally occur. Therefore, the video monitor 116 provides capability information to the system unit 114 without direct user involvement. This is done automatically during each POST, and thus no direct user involvement is required no matter how many times a new monitor is installed.

Video Monitor Function Control

The video monitor 116 also includes logic for controlling the display that a user sees. For example, in one embodiment the video monitor 116 includes horizontal and vertical size control logic, horizontal and vertical position control logic, PCC amp and phase control logic, key and pin balance control logic, color balance control logic, brightness and contrast control logic, and power control logic. Since this logic is standard and is well known to those skilled in the art, details of the operation of this logic are omitted for simplicity. In prior art video monitors these features are varied by controls or knobs provided on the video monitor, and the user adjusts the various controls or knobs to adjust the visual image output from the monitor 116. These controls are expensive and are many times very difficult to use. In addition, these controls require non-volatile memory in the monitor 116 to remember the settings between power cycles, which adds to the cost of the monitor 116. In the preferred embodiment of the invention, the video monitor 116 does not include any external controls or knobs, but rather monitor control software preferably stored in main memory 226 of the system unit 114 enables a user to easily adjust or control the functions of the video monitor 116.

Figure 5:
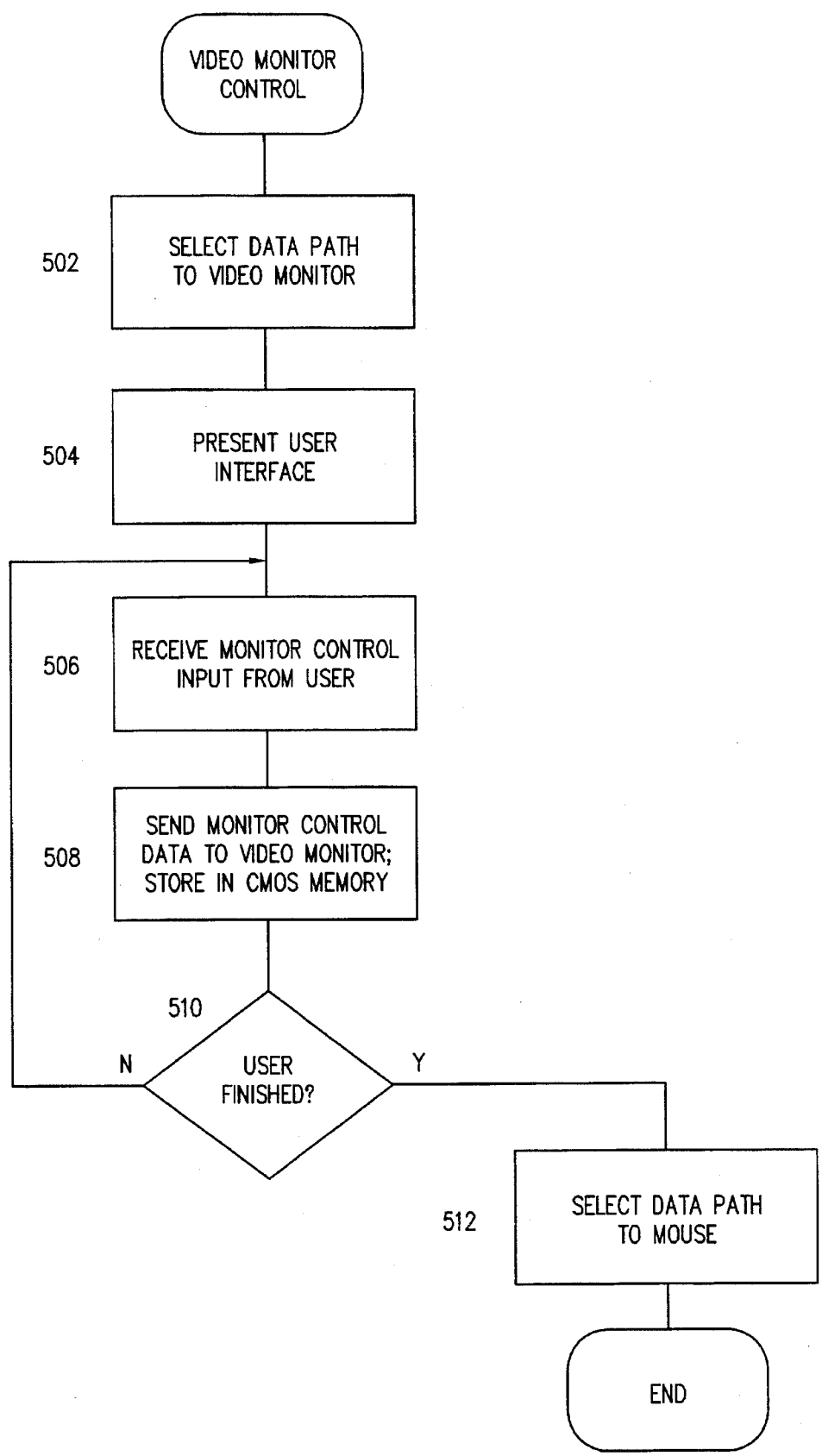
FIG. 5 is a flowchart diagram illustrating a method implemented by the system unit to control the functions of the video monitor.

Referring now to FIG. 5, when a user desires to adjust the output of the video monitor 116, the monitor control software is executed by the CPU 222 and the following operations occur. First, in step 502 a value is written to the mouse port 305 directing the mux logic 260 to select the data path to the video connector 274. This enables the CPU 222 in the system unit 114 to communicate the user selection information to the video monitor 116. The system unit 114 then presents a video monitor control user interface onto the monitor display screen in step 504. Since the manner in which a user interface is generated is well known in the art, details of its generation are omitted for simplicity. The user interface preferably includes a plurality of visual buttons, knobs, slide controls, etc. with corresponding titles to enable a user to easily adjust the monitor's visual output. The user can then use either the mouse 112 or keyboard 120 to make selections on the user interface to adjust or change the visual display of the video monitor 116. For example, the user can change the horizontal and vertical size or position, color balance, contrast etc. as desired. As the user makes selections in the interface to adjust the monitor, this video monitor control data is received by the system unit 114 in step 506. In step 508 the CPU 222 writes this data to the mouse port 305 in the keyboard controller 252, and this data is provided through the mux logic 260 and video connector 274 to the video monitor 116. This data is used by the display control logic in the monitor 116 to adjust the output of the monitor 116 accordingly. The video monitor control data is also stored in the CMOS memory 280 in step 508. The monitor control software continues to loop through steps 506 and 508 while the user is inputting data to adjust the monitor's visual output. When the user is determined to have completed adjusting the monitor 116 in step 510, the CPU 222 in step 512 writes a value to the mouse port 305 directing the mux logic 260 to select the data path to the mouse 112.

Therefore, a bi-directional communication method between a video monitor and system unit in a computer system is shown. This bi-directional communication can be performed with minor modifications to existing components. The bi-directional communication allows the system unit to control all of the standard functions of a video monitor and also enables the system unit to receive monitor capability information from the video monitor without requiring direct user involvement.

Although the method and apparatus of the present invention has been described in connection with the preferred embodiment, it is not intended to be limited to the specific form set forth herein, but on the contrary, it is intended to cover such alternatives, modifications, and equivalents, as can be reasonably included within the spirit and scope of the invention as defined by the appended claims.

What is claimed is:

1. A computer system having simplified video monitor capability information retrieval abilities, comprising:

a video controller;

a video monitor coupled to said video controller and storing video monitor capability information;

a CPU;

a peripheral device;

a communication port coupled to said peripheral device and said video monitor, wherein said communication port includes a first data path to said peripheral device and a second data path to said video monitor, wherein said communication port is adapted for transmitting said video monitor capability information from said video monitor to said CPU; and a multiplexor coupled between said port, said video monitor and said peripheral device, wherein said multiplexor selects either said first data path between said port and said peripheral device or said second data path between said port and said video monitor;

wherein said multiplexor selects said second data path between said port and said video monitor to enable said video monitor to transmit said capability information through said communication port to said CPU.

2. The computer system of claim 1, wherein said video monitor transmits said video monitor capability information through said communication port to said CPU without direct user involvement.

3. The computer system of claim 2, wherein said video monitor transmits said video monitor capability information through said communication port to said CPU during power-on of the computer system.

4. The computer system of claim 1, further comprising non-volatile memory coupled to said communication port which receives and stores said video monitor capability information.

5. The computer system of claim 1, wherein said CPU generates a select signal to a select input of said multiplexor to select either of said first or second data paths.

6. The computer system of claim 1, wherein said peripheral device is a mouse and said communication port comprises a mouse port.

7. The computer system of claim 6, further comprising:

a keyboard controller coupled to said CPU, wherein said mouse port is comprised in said keyboard controller;

wherein said CPU generates data to said keyboard controller directing said keyboard controller to generate a select signal to said multiplexor to select either of said first or second data paths.

8. A computer system having simplified video monitor capability retrieval abilities, comprising:

a video monitor storing video monitor capability information; and a system unit, wherein said system unit comprises:
a CPU;
a video controller coupled to said CPU and said video monitor;
a peripheral device; and
a communication port coupled to said peripheral device and said video monitor, wherein said communication port includes a first data path to said peripheral device and a second data path to said video monitor;
a multiplexor coupled between said port, said peripheral device and said video monitor, wherein said multiplexor selects either said first data path between said port and said peripheral device or said second data path between said port and said video monitor; and wherein said multiplexor selects said second data path between said port and said video monitor to enable said video monitor to transmit said capability information through said communication port to said system unit.

9. The computer system of claim 8, wherein said CPU selects said second data path between said port and said video monitor to enable said video monitor to transmit said capability information through said communication port to said system unit during a portion of power-on of the computer system.

10. The computer system of claim 8, wherein said CPU selects said second data path without direct user involvement.

11. The computer system of claim 8, said system unit further comprising: non-volatile memory coupled to said communication port which receives and stores said video monitor capability information.

12. The computer system of claim 8, wherein said peripheral device is a mouse and said port comprises a mouse port.

13. The computer system of claim 12, said system unit further comprising:
a keyboard controller coupled to said CPU, wherein said mouse port is comprised in said keyboard controller;
wherein said CPU generates data to said keyboard controller directing said keyboard controller to generate a select signal to said multiplexor to select either of said first or second data paths.

14. A method for obtaining video monitor capability information without direct user involvement in a computer system comprising a system unit including a CPU and a video controller, the computer system also including a video monitor coupled to the system unit, wherein the video monitor includes capability information, the method comprising the steps of:
the CPU beginning a power-on routine;
the CPU selecting a first data path between a communication port and the video monitor, wherein said communication port includes said first data path between the communication port and the video monitor and a second data path between the communication port and a peripheral device;
the CPU directing the video monitor to provide the capability information to the system unit along said first data path;
the video monitor providing the capability information to the system unit along said first data path in response to said step of directing; and
the CPU configuring the video controller according to said capability information after said step of providing.

15. The method of claim 14, further comprising:
the CPU selecting said second data path between the communication port and said peripheral device after said step of providing.

16. The method of claim 14, the method further comprising:
the CPU storing the capability information in a non-volatile memory after said step of directing.

17. A computer system having simplified video monitor capability retrieval abilities, comprising:
a video monitor storing video monitor capability information; and
a system unit, wherein said system unit comprises:
a CPU;
a video controller coupled to said CPU and said video monitor;
a peripheral device; and
a communication port coupled to said peripheral device and said video monitor, wherein said communication port includes a first data path to said peripheral device and a second data path to said video monitor;
wherein said CPU selects said second data path between said port and said video monitor to enable said video monitor to transmit said capability information through said communication port to said system unit.

18. The computer system of claim 17, wherein said CPU selects said second data path between said port and said video monitor to enable said video monitor to transmit said capability information through said communication port to said system unit during a portion of power-on of the computer system.

19. The computer system of claim 17, wherein said CPU selects said second data path without direct user involvement.

20. The computer system of claim 17, said system unit further comprising:
non-volatile memory coupled to said communication port which receives and stores said video monitor capability information.

21. The computer system of claim 17, wherein said peripheral device is a mouse and said port comprises a mouse port.

22. The computer system of claim 21, said system unit further comprising:
a keyboard controller coupled to said CPU, wherein said mouse port is comprised in said keyboard controller;
wherein said CPU generates data to said keyboard controller directing said keyboard controller to select either of said first or second data paths.

23. A computer system having simplified video monitor control, comprising:
a video monitor which produces a video output;
an input device which receives video monitor control data input from a user;
a peripheral device;
a system unit, comprising:
memory storing monitor control software;
a CPU coupled to said memory and to said input device, and also to said video monitor though a communication port, wherein said CPU executes said monitor control software to enable a user to adjust said visual output of said video monitor;
said communication port coupled to said peripheral device and said video monitor, wherein said communication port includes a first data path to said peripheral device and a second data path to said video monitor, wherein said communication port is adapted for transmitting said video monitor control data to said video monitor; and a multiplexor coupled between said port, said video monitor and said peripheral device, wherein said multiplexor selects either said first data path between said port and said peripheral device or said second data path between said port and said video monitor;

wherein said multiplexor selects said second data path between said port and said video monitor to enable said communication port to transmit said video monitor control data to said video monitor;

wherein said video monitor adjusts the visual output of said video monitor using said video monitor control data.

24. The computer system of claim 23, wherein when said CPU executes said monitor control software said CPU generates a visual output control user interface on said video monitor; and wherein said input device enables a user to make selections on said user interface to enter said monitor control data and adjust said visual output of said video monitor.

25. The computer system of claim 23, the system unit further comprising: non-volatile memory coupled to said CPU for storing said video monitor control data.

26. A method for simplified video monitor control in a computer system comprising a system unit including a CPU, memory storing monitor control software, and a communication port, the computer system also including a video monitor coupled to the system unit and an input device coupled to the system unit, wherein the video monitor includes logic for controlling the visual output of the video monitor, the method comprising the steps of:

receiving monitor control input data from a user;

storing the monitor control input data in a memory in the system unit;

selecting a first data path between the communication port and the video monitor, wherein the communication port includes said first data path between the communication port and the video monitor and a second data path between the communication port and a peripheral device;

the system unit providing the monitor control input data to the video monitor using said first data path between the communication port and the video monitor; and the video monitor adjusting its visual output according to said monitor control data.

27. The method of claim 26, further comprising:

selecting said second data path between the communication port and said peripheral device after said step of providing the monitor control input data to the video monitor.

28. The method of claim 26, further comprising:

wherein said step of storing comprises storing said monitor control data in a non-volatile memory after said step of receiving.

29. A computer system having simplified video monitor capability information retrieval abilities and simplified video monitor control, comprising:

a video monitor having a visual output and storing video monitor capability information;

memory storing monitor control software;

an input device which receives monitor control input data from a user;

a CPU coupled to said memory, said input device, and said video monitor wherein said CPU executes said monitor control software to enable a user to enter said monitor control data to said CPU to adjust the visual output of said video monitor;

a bi-directional communication port coupled between said CPU and said video monitor which receives said monitor control data from said CPU and provides said monitor control data to said video monitor, wherein said bi-directional communication mechanism further receives said video monitor capability information from said video monitor and provides said video monitor control information to said CPU.

* * * * *